United States Patent [19]

Tashjian

[11] Patent Number: 5,151,657
[45] Date of Patent: Sep. 29, 1992

[54] UNDERGROUND PIPE LOCATING APPARATUS

[76] Inventor: Michael D. Tashjian, 604 Bryant La., Hatboro, Pa. 19040

[21] Appl. No.: 617,258

[22] Filed: Nov. 23, 1990

Related U.S. Application Data

[63] Continuation-in-part of Ser. No. 356,793, May 24, 1989, abandoned.

[51] Int. Cl.$^5$ ............................................. G01V 3/30
[52] U.S. Cl. ............................................. 324/326
[58] Field of Search ........................... 324/326, 66, 67

[56] References Cited

U.S. PATENT DOCUMENTS

| | | | |
|---|---|---|---|
| 3,597,680 | 8/1971 | Haddon | 324/326 |
| 3,893,025 | 7/1975 | Humphreys, Jr. | 324/67 |
| 3,975,735 | 8/1976 | McCullough et al. | 324/67 |
| 4,449,098 | 5/1984 | Nakamura et al. | 324/326 |
| 4,573,829 | 3/1986 | Keene et al. | 324/67 |

FOREIGN PATENT DOCUMENTS 63-203416  7/1988  Japan ................... 324/326

*Primary Examiner*—Walter E. Snow
*Attorney, Agent, or Firm*—Gregory J. Gore

[57] ABSTRACT

Apparatus intended to be used with equipment that is inserted into an underground pipe or conduit, which equipment may include a head that is attached to a member such as a hose or cable, which has a wire attached thereto along its length, the wire is connected to a signal generator which provides a signal to be detected by a receiver above ground to provide the location of the member and its depth. The antenna wire is of a highly electrically conductive metal, such as copper. The construction of the wire may be coaxial employing a flexible, yet rigid, spiraled coil steel cable which surrounds the antenna wire.

5 Claims, 2 Drawing Sheets ced. No prior art of
UNDERGROUND PIPE LOCATING APPARATUS This is a continuation-in-part of application Ser. No. 356,793, filed May 24, 1989, now abandoned.

BACKGROUND OF THE INVENTION

1. Field of the Invention

This invention relates to an underground locating apparatus which includes a wire connected to a signal generator and carried by a hose or cable, which wire transmits a signal that is detected by an above ground receiver.

2. DESCRIPTION OF THE PRIOR ART

Apparatus for unclogging and or cleaning underground pipes is in widespread use. Typically such apparatus includes a head, which is attached to a hose connected to a source of water under pressure. The head and hose are fed into a pipe to be cleaned or unclogged, and water under pressure is introduced into the hose and comes out of the head blasting away debris or obstructions in the pipe. The direction of the water jet also forces the head forward, pulling the hose through the pipe. Examples of such devices are shown in the Kirschke U.S. Pat, No. 3,656,694, Johnson U.S. Pat. No. 3,937,404, Sato U.S. Pat. No. 3,959,840, Klein U.S. Pat. No. 4,312,679, Marsau U.S. Pat. No. 4,687,011, and Larson U.S. Pat. No. 4,756,324. Typically, the pipe to be cleaned or unclogged is underground at and undetermined location and depth, with branches and unknown diversions from a straight and determinate path. Additionally many times tree roots have grown into the pipe, or portions of the pipe have caved in, preventing travel to the head and requiring that the pipe be dug up for cleaning and repair. In order to minimize the time and expenditures involved in digging up the clogged pipe it is highly important to be able to locate the exact location and depth of the clogged pipe as quickly and accurately as possible.

Underground obstruction and observation devices are also used by the electric and telephone utilities to locate problems in their underground conduits and the precise location of the problem is very important to minimize disruption of service and cost. Such devices typically involve a head which may contain a video camera connected to a cable which head also carries a transmitter as previously described.

Various devices have been proposed for locating the head of the cleaning device and hopefully the obstruction such as those shown in the Lowy U.S. Pat. No. 1,662,429, Pearson U.S. Pat. No. 2,558,977, Brenholdt U.S. Pat. No. 2,601,248 and Bell U.S. Pat. No. 2,820,959. Such devices typically require a transmitter carried on the head, which emits a signal that is detected by an above ground receiver. U.S. Pat. No. 4,573,829 to Keene et al discloses a fish wire and transmitter for locating plastic pipe. The Keene device employs a length of flexible piano wire connected to a transmitter at the home end of the wire. No prior art of which the applicant is aware teaches or suggests an antenna wire for locating underground pipe which employs the construction and selection of materials discovered and claimed by the applicant. No prior art device is capable of the performance of applicant's invention.

Many of the pipes with which the devices are used are of cast iron, which causes considerable difficulty in transmitting and detecting the signals emitted from the head due to interference from the metal pipe. In addition other utilities such as electricity and telephone are often in the same location as the pipe being cleaned, with the result that they detect false and spurious signals because of "signal jumping" resulting in wasted time and considerable needless expense.

The apparatus of the invention provides a signal that permits the entire hose or cable and head to be detected both as to location and depth and which provides various other advantages.

SUMMARY OF THE INVENTION

An underground locating apparatus for precise location of underground pipes or conduits, which includes a head carried on a member which is introduced into a pipe, with a wire carried the entire length of the member to which a signal generator is connected, which provides a signal that is detected by an above ground detector to provide the desired depth and location of a pipe or conduit. High pressure water is fed to the head, which propels the member forward pulling both the water hose, and the antenna wire. The antenna wire is made of a highly conductive metal, such as copper, which is too soft to be used alone, but which according the present invention is affixed to the water hose or to another, more rigid member. Thus, the copper antenna wire is pulled by a second element through the pipe to be located, rather than being pushed as a single wire through the pipe. In an alternate embodiment, a spiral coil wire houses the antenna wire which coil serves as the feed member. In this alternate embodiment, the antenna wire is located within and concentric to the coil wire. This coaxial cable is fed mechanically into the pipe. The stiffness of the outer coil wire provides the sufficient force, yet provides adequate flexibility to push the coaxial pair of wires forward through the pipe.

The principal object of the invention is to provide underground locating apparatus that provides highly accurate data on the depth and location of a pipe or conduit.

A further object of the invention is to provide underground locating apparatus of the character aforesaid that is useful with a wide variety of equipment.

A further object of the invention is to provide underground locating apparatus of the character aforesaid that is easy to operate, reliable and enjoys a long service life.

A further object of the invention is to provide underground locating apparatus of the character aforesaid that is economical to install and operate.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely, and that various modifications and changes can be made in the structures disclosed without departing from the spirit of the invention.

DESCRIPTION OF THE PREFERRED EMBODIMENT

Figure 1:
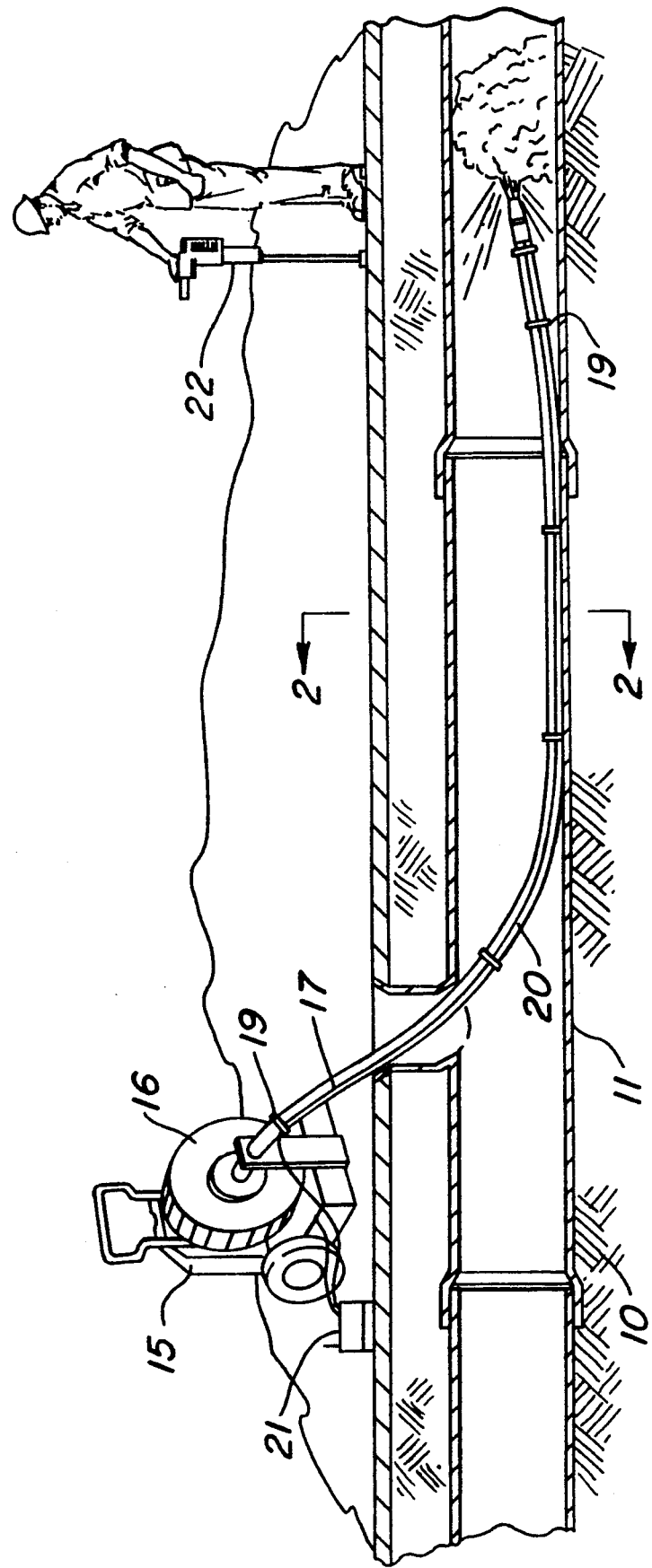
FIG. 1 is an illustrative view, in partial section, of the underground locating apparatus of the invention.

Referring now more particularly to FIG. 1, a portion of ground 10 is illustrated with a segmented pipe 11 therein, which pipe can be case iron, clay, plastic or other material. In this illustration a jet cleaning apparatus 15 is shown which includes a reel 16 carrying a member 17 which is a length of hose, and which is connected to a water jet head 18.

The apparatus 15 is preferably of the type as exemplified by the Jetter 2200 series available from Mustang Units Co., Inc., Eldridge, Iowa, 52748, however other apparatus can be used as desired.

Figure 2:
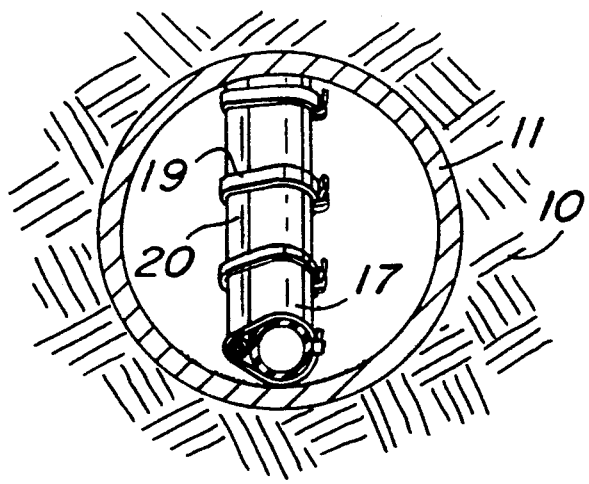
FIG. 2 is a cross-sectional view taken from FIG. 1 as shown in that figure.

The hose 17 has at least one wire 20 attached thereto by a strap 19 as more clearly depicted in FIG. 2. The wire 20 extends its entire length, which wire can also be an integral part of the hose as shown in FIG. 3.

The wire 20 is attached to a transmitter device 21, such as the Line Tracer Model 810 as manufactured by Metrotech Corp., Mountain View, Calif. The signal transmitted by wire 20 is detected by a detector receiver 22 such as that sold with the Line Tracer model 810, and which receives signals emitted by wire 20, interprets then and provides data read out as to depth and location when the device is over the wire 20. Because of the signal transmission along the entire length of the member 17, any portion of the hose can be readily located through any type of pipe.

Figure 3:
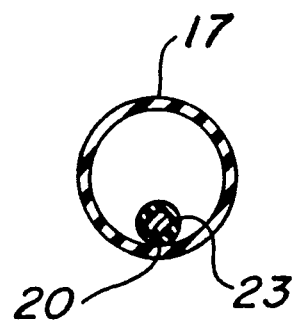
FIG. 3 is a cross-sectional view of one embodiment of the present invention wherein the antenna wire is included within the hose.
Figure 4:
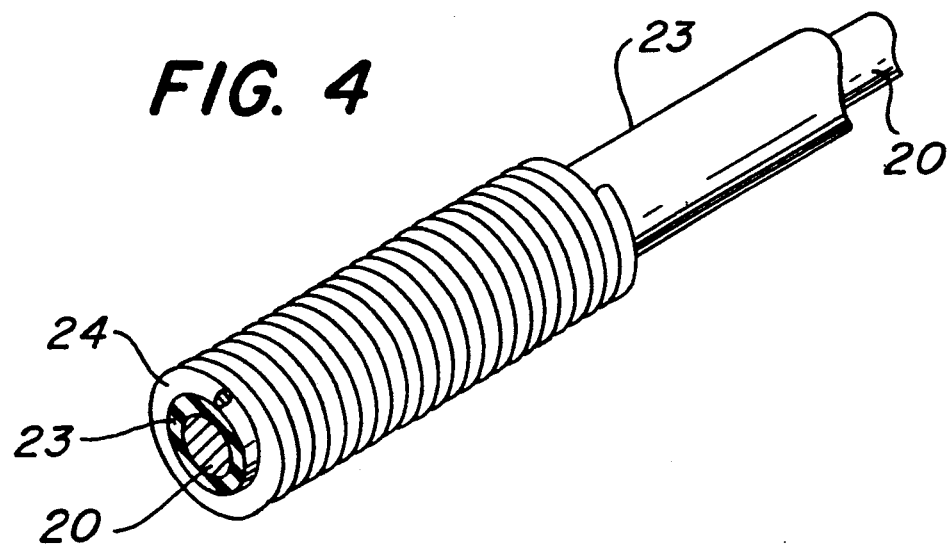
FIG. 4 is a top, front isometric view of a coaxial antenna wire.

Referring to FIGS. 2, 3 and 4, wire 20 is preferably made of copper of approximately 8 gauge, surrounded by a thin insulating jacket 23. It is important feature of the invention that a highly conductive metal, such as copper, be used for the signal-carrying portion of the antenna wire to prevent "signal jumping". Signal jumping is a condition which occurs when other underground conductors are in the vicinity of the antenna wire. It has been discovered that when copper is used for the material of wire 20, the transmitter signal is not disturbed by other underground pipes or conductive wires. When a less conductive antenna wire is used, there is a tendency for the transmitter signal to jump to other underground conductors which may be of a higher electrical conductivity.

Referring now to FIG. 4, an alternate construction of the antenna wire of the present invention is shown. In this embodiment, antenna wire 20 includes outer spiral wire 24 which encases the copper core wire 20 which is, in turn, surrounded by insulating jacket 23. The outer spiral wire 24 is made of a rigid metal, such as spring steel, while the antenna core wire is preferably made of a highly conductive metal, such as copper. With this coaxial construction, the outer spiral wire supplies the rigidity and flexibility necessary for a feed wire that is to be mechanically forced through a pipe. The coaxial cable also provides the highly conductive properties of copper, which alone would be inappropriate since it is much too soft to transmit the force necessary to push itself through a pipe. This novel antenna wire construction is a significant advancement in the art of underground pipe locating and overcomes a major deficiency of the prior art which displays the unwanted signal-jumping characteristic described above.

It will thus be seen that an underground locating apparatus has been provided with which the objects of the invention are attained.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

I claim:

1. In an underground locating apparatus for use with devices to be inserted into underground pipes or conduits, which devices include a head, and a member for insertion into the pipe, the improvement which comprises
   a signal transmitter,
   at least one antenna wire connected to said signal transmitter and to said member to cause emission of a signal along its length,
   a signal detector which detects the emitted signal and provides its depth and location, and
   fluid means originating above ground and directed under pressure along said member for pulling said member forward into the pipe.

2. An underground locating apparatus as described in claim 1 in which said device includes a pipe cleaning head carried on a hose.

3. An underground locating apparatus as defined in claim 2 in which said antenna wire is of coaxial construction, including an outer spiral steel coil wire coaxial with and surrounding an inner core wire having an electrical conductivity greater than steel.

4. An underground locating apparatus as defined in claim 3 wherein said inner core wire is made of copper.

5. The underground locating apparatus of claims 1 further including a high pressure water hose whereby high pressure water is fed to the head which pulls both the water hose and the antenna wire forward through the pipe.

* * * * *